(12) United States Patent
Bradstreet (10) Patent No.: US 11,978,966 B2
(45) Date of Patent: May 7, 2024

(54) METHOD FOR BEAMFORMING

(71) Applicant: SRC, Inc., North Syracuse, NY (US)

(72) Inventor: Lance M. Bradstreet, Liverpool, NY (US)

(73) Assignee: SRC, Inc., North Syracuse, NY (US)

( * ) Notice: Subject to any disclaimer, the term of this patent is extended or adjusted under 35 U.S.C. 154(b) by 0 days.

(21) Appl. No.: 17/149,620

(22) Filed: Jan. 14, 2021

(65) Prior Publication Data
US 2021/0218444 A1 Jul. 15, 2021

Related U.S. Application Data (60) Provisional application No. 62/960,983, filed on Jan. 14, 2020.

(51) Int. Cl.
*H01Q 3/00* (2006.01)
*H01Q 3/26* (2006.01)
*H01Q 21/00* (2006.01)
*H04B 7/06* (2006.01)

(52) U.S. Cl.
CPC ............... *H01Q 3/26* (2013.01); *H01Q 3/00* (2013.01); *H01Q 3/2611* (2013.01); *H01Q 21/00* (2013.01); *H04B 7/0617* (2013.01)

(58) Field of Classification Search
CPC .......... H01Q 3/26; H01Q 3/00; H01Q 3/2611; H01Q 21/00
USPC .................................................. 342/368, 372
See application file for complete search history.

(56) References Cited

U.S. PATENT DOCUMENTS

| | | | | |
|---|---|---|---|---|
| 6,480,154 B1 * | 11/2002 | Bella | ........................ | H01Q 3/26 342/372 |
| 7,016,437 B2 * | 3/2006 | Denno | ................ | H01Q 3/2605 375/346 |
| 7,973,713 B2 * | 7/2011 | Gallagher | ................ | H01Q 3/26 342/373 |
| 10,419,849 B2 * | 9/2019 | Franck | .................... | H04R 3/005 |
| 11,217,889 B2 * | 1/2022 | Ray | ....................... | H04B 7/0617 |
| 2007/0213098 A1 * | 9/2007 | Sung | ....................... | H04W 16/28 455/562.1 |
| 2013/0016003 A1 * | 1/2013 | Stirling-Gallacher | ... | H01Q 3/26 342/372 |

FOREIGN PATENT DOCUMENTS

| | | | | |
|---|---|---|---|---|
| KR | 20130017881 A | * | 3/2013 | ............... H01Q 3/26 |
| RU | 2567120 C1 | * | 11/2015 | ............... H01Q 3/26 |
| WO | WO-2016010286 A1 | * | 1/2016 | ........... H04B 7/0408 |
| WO | WO-2020255324 A1 | * | 12/2020 | ............... H04B 7/08 |

* cited by examiner

*Primary Examiner* — Chuong P Nguyen
(74) *Attorney, Agent, or Firm* — George R. McGuire (57) ABSTRACT

A new way of beamforming in a phased array through use of a compression algorithm. The compression algorithm provides a beamforming technique that requires less memory, computes beams faster, and can be done without losing information as compared to prior art beamforming methods.

20 Claims, 9 Drawing Sheets

```
 1   File created by SNIFTD on 19/ 9/ 2 at 15:41:30
 2   SNIFTD Setup File. Created in MATLAB.
 3      360    360    102    102    1
 4   Rotation angles (Theta, Phi, Chi)=(   0.00000,   0.00000,   0.00000)
 5      0.0000       180.00       0.0000       359.00       0.00000
 6      0.0000       180.00       0.0000       359.00       0.00000
 7   C:\NFDataFiles\Gryphon\Setup_246.inp
 8   C:\NFDataFiles\Gryphon\NFInput_246.dat
 9        0   41.4045
10      3.712126E-02      7.370327E-02      1.960824E+00      1.473214E+00
11      3.702943E-01      2.264446E-01      9.079209E-02     -1.351494E+00
12     -6.695422E-02      3.008451E-01      8.413828E-01      1.071729E-01
13     -8.931924E-02     -2.860604E-01      3.028631E-01     -7.206740E-01
14     -1.018573E-01     -1.431292E-01      4.611625E-01     -1.044451E+00
15      2.084579E-01      1.231377E-01     -5.648006E-02      1.030679E+00
16      3.393820E-01     -6.826446E-01      8.434523E-01     -1.007499E+00
17      1.475175E-01      1.110529E-01      1.201899E-02      2.219926E+00
18      1.937690E-01     -1.919517E-01      1.172962E+00     -3.987597E-01
19     -6.067161E-01     -1.199615E-01      1.502611E+00      2.031356E+00
20      2.443495E-01      8.629776E-01      6.026064E-01     -6.945228E-01
21     -4.016061E-01     -2.970933E-01      1.992201E+00      4.014005E-01
22      3.290384E-01      6.477164E-01     -6.396843E-01     -3.311660E-01
23     -5.078498E-02     -3.571590E-01      2.057189E+00     -7.995046E-01
24     -3.344355E-02      3.561207E-01     -7.683683E-01     -2.398487E-01
25      1.748331E-01     -1.857326E-01      1.156665E+00     -1.729629E+00
26     -5.864145E-03      4.977081E-01     -1.942791E-01     -1.181495E-01
27      1.786471E-01     -1.897166E-01     -1.215446E-01     -1.576393E+00
```

FIG. 14

| Class | Range of Values | Conversion Function |
|---|---|---|
| Signed 8-bit integer | $-2^7$ to $2^7-1$ | int8 |
| Signed 16-bit integer | $-2^{15}$ to $2^{15}-1$ | int16 |
| Signed 32-bit integer | $-2^{31}$ to $2^{31}-1$ | int32 |
| Signed 64-bit integer | $-2^{63}$ to $2^{63}-1$ | int64 |
| Unsigned 8-bit integer | 0 to $2^8-1$ | uint8 |
| Unsigned 16-bit integer | 0 to $2^{16}-1$ | uint16 |
| Unsigned 32-bit integer | 0 to $2^{32}-1$ | uint32 |
| Unsigned 64-bit integer | 0 to $2^{64}-1$ | uint64 |

METHOD FOR BEAMFORMING

CROSS-REFERENCE TO RELATED APPLICATION

The present application relates and claims priority to U.S. Provisional Application No. 62/960,983, filed Jan. 14, 2020, the entirety of which is hereby incorporated by reference.

FIELD OF THE INVENTION

The present disclosure is directed generally to a method for beamforming and more particularly to technology for addressing processing times for forming beams.

BACKGROUND

Phased arrays typically have over a thousand steering angles and each steering angle requires a transmit beam along with multiple receive beams. If the beamforming process can be sped up, it can have a significant impact on the overall time to compute the calibration file.

Figure 1:
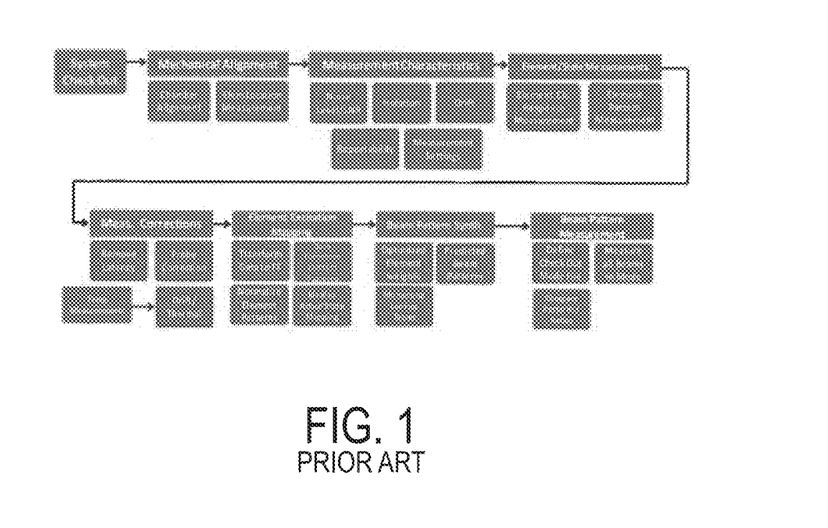
FIG. 1 depicts a flowchart of a calibration method.

Regarding calibration, FIG. 1 shows the standard calibration pieces. The pieces of interest to the present invention are the element pattern measurements and the beam pattern synthesis. Because of the geometry of the spherical chamber, the path from the probe to each element is different. This difference is accounted for in a back-transformation which is used to compute the element path response. In order to compute a back-transformation, the entire 3D element pattern must be measured and stored over frequency.

Figure 2:
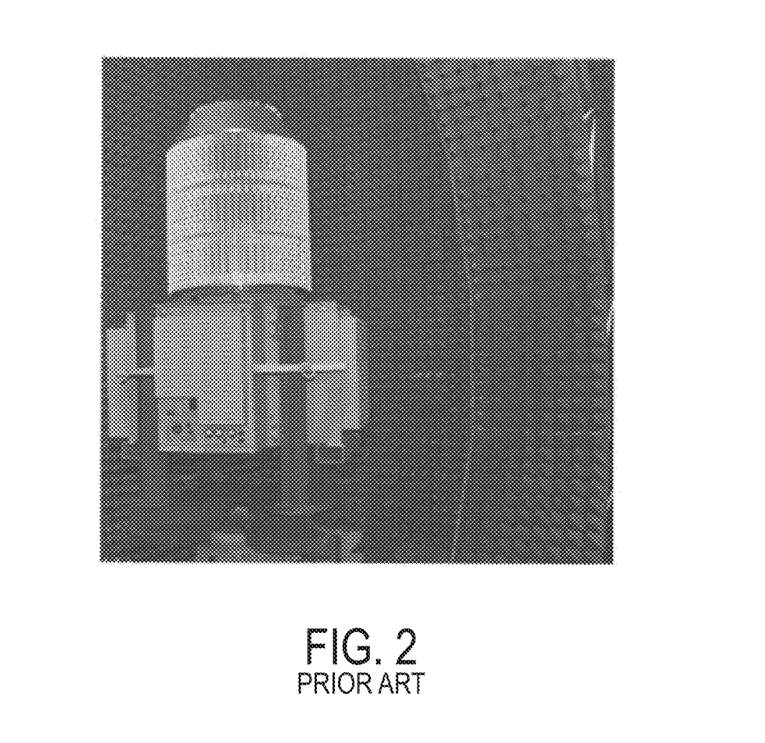
FIG. 2 depicts an example radar in a near-field chamber.

The beam synthesis routine uses the state measurements and the measured element patterns to construct the full array patterns. If the array is large enough, it could be argued that a similar element pattern could be used for all element, but this decision influences the accuracy of the radar. The edge elements will radiate different patterns and depending on the array, the structure of the array can also affect the element patterns. FIG. 2 shows the OWL radar setup in the near-field chamber. The large base below the array influences the element pattern shape.

Figure 3A:
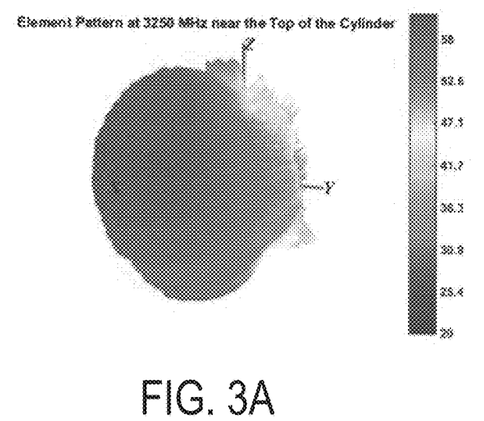
FIG. 3A depicts an example element pattern of an antenna element located near the top of an example cylindrical radar.
Figure 3B:
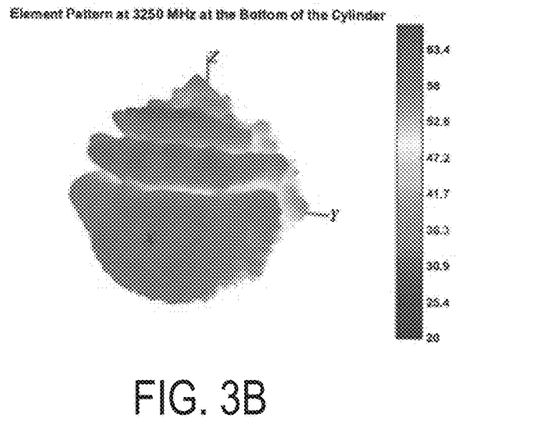
FIG. 3B depicts an example element pattern of an antenna element located near the bottom of an example cylindrical radar.

FIGS. 3(a) and 3(b) show an element near the top of the array and an element near the bottom of the array, respectively. The figures show that even though OWL is a fairly large array, it is not sufficiently large to use a single element pattern in the beam synthesis without sacrificing accuracy.

Figure 4:
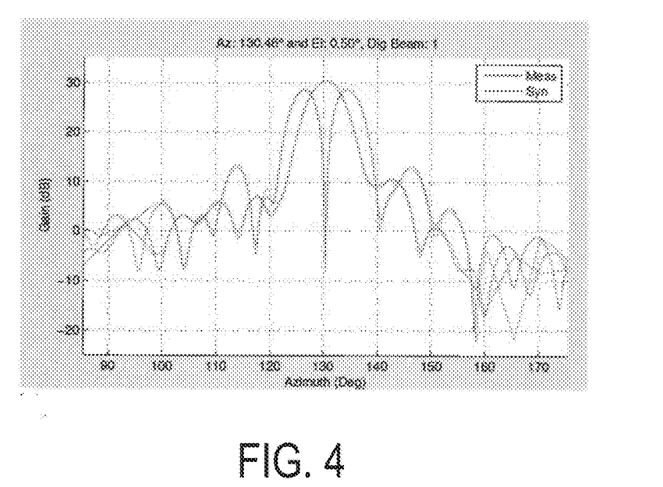
FIG. 4 depicts an example of measured beams and synthesized beams using individual element patterns.

The advantage of using individual element patterns in the beam synthesis is that it results in the most accurate beam predictions. FIG. 4 shows an example of measured beams and synthesized beams using individual element patterns. The figure shows excellent agreement near the main part of the beam and the inner sidelobes. The figure also shows that the plots diverge at the outer angles which is due to a reduction in resolution for the synthesized beams which is a problem that this document will address.

The disadvantage to using individual element patterns is that the pattern data takes up a lot of space and requires a lot of memory to load in the data and beamform the patterns. For reference, one sample array requires 507 MB to store 256 element patterns per frequency, another requires 1.014 GB for 512 elements per frequency, the example shown in FIGS. 2-4 requires over 2 GB per frequency. The file size requirements are for a one-degree resolution in both phi and theta. However, one degree is insufficient for monopulse which requires a high resolution in order to capture the steep slope of a delta/sum ratio.

In terms of interpolation, the synthesis routine loads in the individual element patterns which are then interpolated to a low-resolution pattern set for computing characteristics like gain, sidelobe levels, beamwidths, etc., and also to a high-resolution pattern set for computing monopulse. The high-resolution patterns require a lot of computation time and memory so the angle space is limited to the area around the monopulse region. The routine computes multiple Rx beams for each Tx steering angle, therefore, the high-resolution interpolation must cover all of the angles of interest so that multiple high-resolution patterns don't need to be computed and stored.

Figure 5:
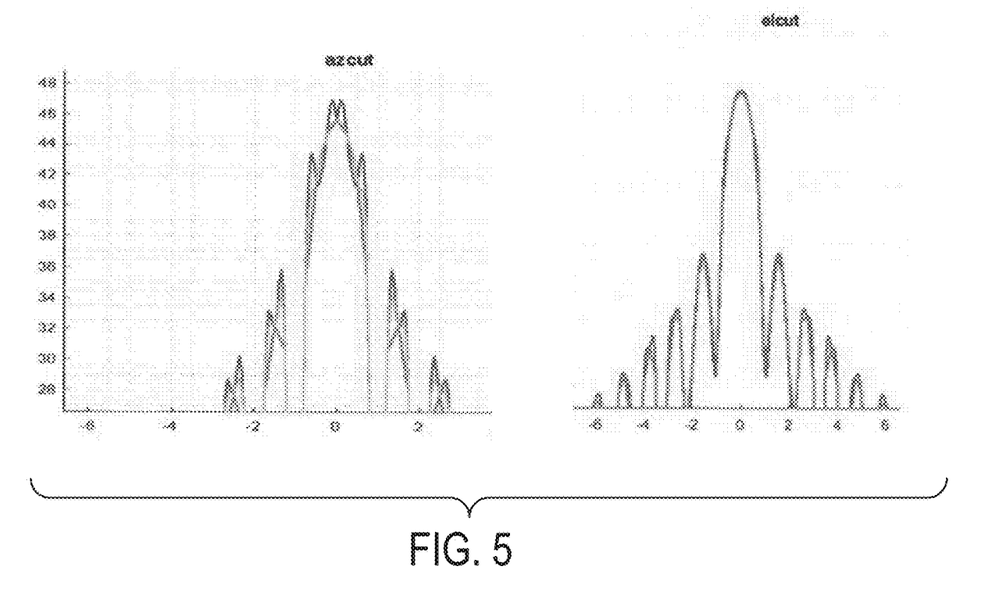
FIG. 5 depicts an example of beam pattern interpolation.

The element patterns are interpolated instead of the beam patterns because the element pattern is much smoother and can more easily be interpolated without error. FIG. 5 shows an example of beam pattern interpolation. The elevation cut interpolated without any issues, but the azimuth cut results in overshoots of the actual data points using both spline and cubic interpolation functions. This behavior is a function of the interpolation scheme used which must be some kind of spline function because a linear interpolation will lead to monopulse errors.

Because of the unknown behavior and questionable accuracy of some of the spline interpolation functions, the element patterns are interpolated instead. A high-resolution element pattern sums up to a high-resolution beam pattern. It may seem trivial to interpolate a smooth element pattern but this is not the case. What's not usually shown in a plot of the element pattern is the phase pattern. As the element pattern gets farther from the center of the coordinate system, the phase varies rapidly. The equation for the phase term is shown in Equation 1 where $\vec{R}$ is the X, Y, Z location in meters.

Interpolation through a rapid phase variation is prone to error and results in high frequency jitter on the formed beam pattern, instead, the analytic phase variation can be removed from the element pattern resulting in a smooth phase which can then be interpolated. Once the interpolation is complete, the phase variation can be computed at a higher resolution and added back to the pattern.

$$e^{ik(\vec{r}\cdot\vec{R})} \quad \text{Equation 1: Pattern Phase Term}$$

$$k = \frac{2\pi}{\lambda} \quad \text{Equation 2: Wave Number}$$

$$\vec{r} = \sin\theta\cos\varphi\hat{X} + \sin\theta\sin\varphi\hat{Y} + \cos\theta\hat{Z} \quad \text{Equation 3: Spatial Component}$$

Once the element patterns have been sufficiently interpolated, the beam patterns can be formed. In order to generate monopulse ratios, the proper cuts need to be taken out of the beam patterns. The cuts are taken by computing the phi/theta angles needed for the az/el cuts or UVW cuts and then interpolating these points from the high-resolution beam patterns to pull out the required data points for the monopulse ratios. The time required for this operation is a function of the resolution of the beam patterns.

The overall point is that generating accurate, high resolution cuts that can be used for monopulse is a rather cumbersome process that requires a lot of memory and CPU resources which get magnified when running multiple processes at once.

It is useful to understand the procedure of compression algorithms, and in particular mp3 compression.

Compression has three main components, the encoder, the compressed data, and the decoder. The encoder takes the original signal and applies some kind of signal processing technique to either represent the data in a different way or remove excess data. The compressed data is the encoded data and occupies a smaller file size than the original data. The decoder can take the compressed data and recreate the original signal perfectly if the compression is lossless or can recreate a decent representation of the original signal in the case of lossy compression.

The MP3 compression algorithm first slices up the audio signal into windows and then applies a DCT (discrete cosine transform) to each window. The output of the DCT is a set of coefficients that can be combined with the cosine function to recreate the signal. As a side note, it was found that cosines better represent audio than exponentials which is why a DCT is used instead of a DFT. The resultant coefficients are then stored in the file instead of the audio signal. Because the size of the coefficients is much less than the audio signal, the file size is significantly reduced.

Figure 6:
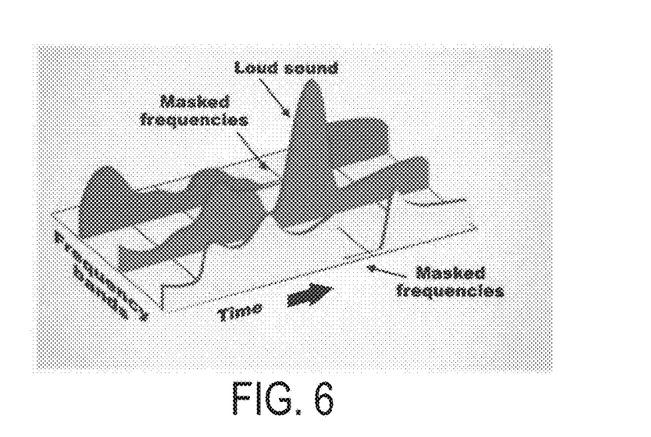
FIG. 6 depicts an example of filtering undertones in an MP3 compression algorithm.

Along with storing coefficients, the MP3 compression algorithm also uses knowledge about the range of human hearing to filter out frequencies. The algorithm also assumes that if there's an overpowering sound in one frequency band, that the undertones can be filtered out with very little effect on the overall signal as shown in FIG. 6.

Storing only the coefficients reduces the file size but the decoder must know how to reconstruct the signal. Reconstructing the signal also involves additional steps because the signal must be computed instead of reading from a file. MP3 would be considered a loss compression because the decoder cannot recreate the input signal, due to some of the filtering that happened in the encoding process.

The main takeaway from the MP3 compression algorithm is that unneeded information can be filtered out and that it's possible to store coefficients instead of the actual signal as long as the decoder knows what to do with the coefficients. In the case of MP3, the cosine function is used as a basis function for encoding and decoding the signal. The decoder uses the coefficients as weighting function to recreate the signal using a weighted summation of cosine functions.

Accordingly, there is a need in the art for a beamforming method that uses less memory and provides for faster beamforming times without the loss of any information.

SUMMARY

The present disclosure is directed to a beamforming method.

BRIEF DESCRIPTION OF THE DRAWINGS

The present invention will be more fully understood and appreciated by reading the following Detailed Description in conjunction with the accompanying drawings, in which:

FIG. 14 depicts an example coefficient file.

FIG. 15 depicts an example of numeric integer types in Matlab.

DETAILED DESCRIPTION OF EMBODIMENTS

The present disclosure describes a method for beamforming.

Regarding spherical near field properties, the spherical near-field chamber is used to measure the fields on an enclosed surface at a given radius and if the fields are sampled properly, the fields can be determined at any radius. This is done through a mode matching technique. Analytic spherical modes are computed for the measurement radius and then a set of coefficients are calculated that best match the modes with the measured patterns. The same coefficients are then applied to the far-field spherical modes to compute the far-field pattern.

When discussing the number of spherical modes, reference is made to the number of azimuthal modes. For each azimuthal mode, there are a set of polar modes. The spherical near-field transformation software organizes the modes in terms of azimuthal modes so that same convention will be followed in this document. For example, if a certain antenna pattern requires m modes, that means the antenna pattern requires m azimuthal modes but there are also n polar modes for each azimuth mode and s=2 sets for each azimuthal mode. Therefore, the number of coefficients required is not completely described by stating the number of spherical modes in terms of the number of azimuthal modes.

The number of modes required for full reconstruction of the pattern is a function of the frequency and size of the antenna. An empirical equation for the number of modes is given in Equation 4 where k is the wavenumber and r_0 is the radius of the minimum sphere. The minimum sphere is the sphere that completely encloses all radiating sources. A radiating source is not only the antenna elements but also the antenna structure and any potential scattering sources. Similar to waveguide modes, the number of propagating spherical modes increases as the electrical size increases. Therefore, the larger the structure, the more modes it will take to accurately describe the pattern. It does not make sense to increase the size of the minimum sphere more than what is required because that will only result in higher order modes that potentially just add noise to the pattern.

$$N = kr_0 + 10 \qquad \text{Equation 4: Number of Spherical Modes}$$

Equation 4 also shows why centering the AUT in the spherical near-field chamber has computational advantages. When the AUT and its corresponding structure are centered at the spherical coordinate system, the r0 term is minimized which also minimizes the number of spherical modes, N. A smaller number of spherical modes leads to reduced computation time and an increased angular sampling rate which is a function of the distance between adjacent points on the minimum sphere.

The spherical near-field chamber came with SNIFTD and ROSCOE which are used in the near-field to far-field transformation. This is an old piece of software originally written in the 80's and is supplied by TICRA out of Denmark. The TICRA software reads in the measured pattern data, computes the appropriate coefficients based on the number of modes, and can then use those coefficients to compute the far-field pattern along with the pattern at any user-specified radius. One feature of the TICRA software is that it will output the modal coefficients in a text file and the software can also compute a pattern based only on the coefficient file without needing the measured pattern data. This makes it a powerful software tool as the coefficient file can be written in Matlab and the TICRA software can be used to compute the pattern.

Once the coefficients are computed, the pattern can be evaluated using Equation 5. The coefficients are the Q terms. The coefficients are complex terms which are multiplied by the analytic function, F. Once the coefficients are known, they can be used to evaluate the pattern at any angle by evaluating F at the corresponding angle. As stated above there are azimuthal modes (m), polar modes (n), and two sets of each (s) which make up the full set of coefficients.

Equation 5: E-field as a Sum of Spherical Waves $$\vec{E}(r, \theta, \phi) = \frac{k}{\sqrt{\eta}} \sum_{s=1}^{2} \sum_{n=1}^{N} \sum_{m=-n}^{n} Q_{smn} \vec{F_{smn}}(r, \theta, \phi)$$

Similar to how the MP3 compression algorithm stores only the DCT coefficients, the same idea can be applied to antenna patterns. Instead of storing E_φ and E_θ pattern values at specified angle points, the coefficients can be stored in a computer memory instead. The decoder would then take the coefficients and evaluate the pattern at the specified angles by solving Equation 5. The advantage of storing the coefficients is that the pattern can be generated at any angles and at any user specified resolution. Not only is the file size smaller, but unlike MP3 compression where data is lost, data is actually gained. If the direct patterns are stored and a higher resolution is needed, the pattern points must be interpolated from the stored patterns.

The effectiveness of a compression algorithm is described in terms of the compression ratio which is the ratio of the uncompressed data to the compressed data. The compression ratio of an MP3 is typically around 10:1.

As an example, the Gryphon array will be used as a test case. Gryphon is a rectangular planar array composed of 256 elements. Determining the compression ratio for patterns is somewhat up to the user because the size of the pattern data can fluctuate quite rapidly depending on the resolution. For typical arrays at SRC, the pattern is stored at a 1-degree resolution so that will be used as the benchmark. As stated in section 2.1 a higher resolution is required but it becomes impractical to store more than a 1-degree resolution. At some point, it's easier to go through the interpolation step then to load large data files from disk.

The Gryphon element patterns are stored per frequency and each file is 507 MB in size. The file contains the individual element patterns stored at 1-degree resolution for all 256 elements. The corresponding coefficient file has a size of 83 MBs which is compression ratio of 6.1. This isn't great but the Gryphon array size includes the element array plus almost double the array size to include the chassis and results in 103 coefficients. Because the number of coefficients is a function of the array size, the compression ratio should increase for a smaller array and decrease for a larger array.

Similar to how an MP3 filters out unneeded data, the modal power can be analyzed to see if all the modes are required. The power in a mode can be computed from the coefficients using Equation 6. The power for each mode can be computed to determine how much of it affects the overall pattern.

$$P_{rad} = \frac{1}{2} \sum_{smn} |Q_{smn}|^2 \quad \text{(Equation 6: Mode Power)}$$

Figure 7:
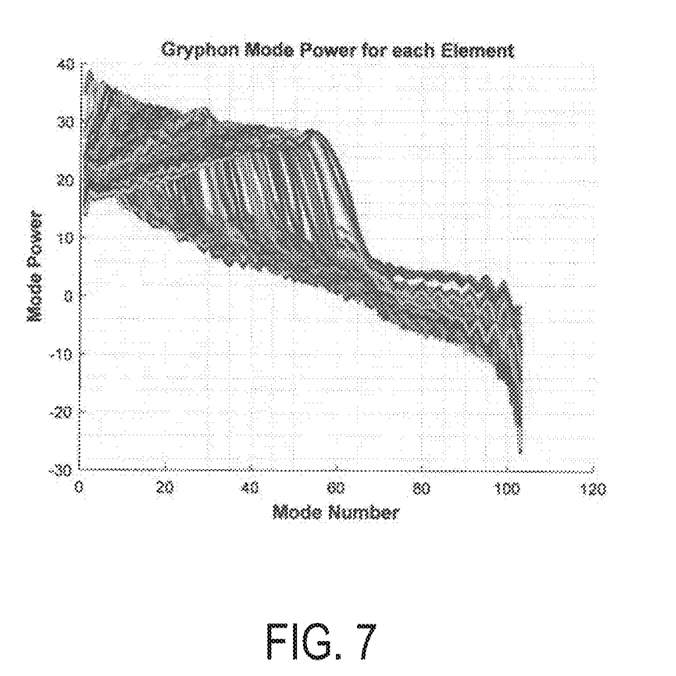
FIG. 7 depicts an example of mode power for each element versus the number of modes.
Figure 8:
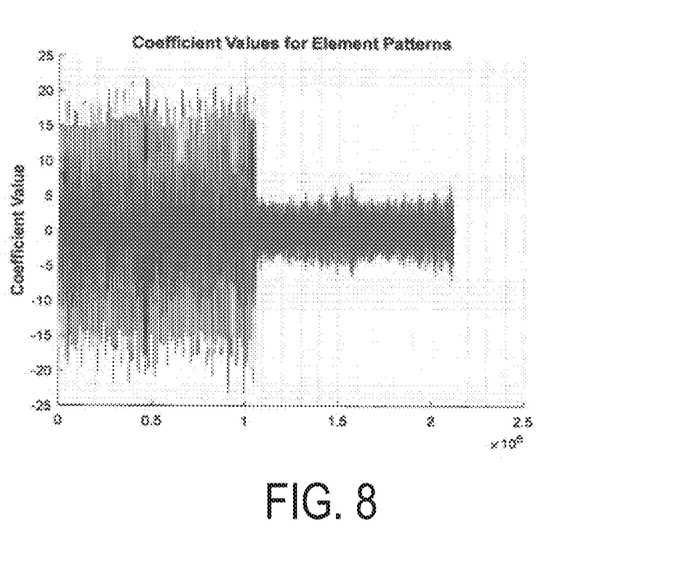
FIG. 8 depicts coefficient values for element patterns.

FIG. 7 shows the mode power for each element vs the number of modes. The mode power is expressed in terms of dB. FIG. 7 shows that the power decreases substantially after about 65-70 modes. This information can be used to truncate the modes and reduce the size of the coefficient file.

If the coefficients are reduced from 103 to 65, the coefficient file is reduced from 83 MBs to 70 MBs. The reduction is not that drastic because there aren't as many polar modes for each azimuthal modes once you get above 65. With modal truncation, the compression ratio improves to 7.24. To further reduce the file size, the number of modes could be allowed to vary per element pattern. This would require coming up with some rule-of-thumb that would say aver some X number of dB below the peak, the modes can be truncated with little loss of information.

The default data type for a floating-point number in Matlab is double precision which requires 64 bits. Pattern data generally has a large dynamic range and can easily span over 60 dB. The modal coefficients do not span as wide a range. The coefficient values for the Gryphon element patterns are shown in FIG. 5, which plots the real and imaginary components of the coefficients. The values span about +/−20 in linear units. This is a much smaller spread of data which can be represented with a more efficient data type.

If the coefficients are stored with single precision, the file size reduces to 35 MBs. However, even single precision might not be necessary. If the coefficients are multiplied by 1000 and stored as int16, the file size reduces to 14 MBs. Assuming int16 is sufficient, this results in a final compression ratio of $$\frac{507}{14} = 36.2.$$

The achieved compression ratio is significant because Gryphon requires 11 frequencies which adds up to 5577 MBs. Using in16 and modal truncation, the data can be stored with only 154 MBs. This not only saves disk space but it also saves time when loading the data from disk storage.

Equation 5 shows that the E-field can be computed by multiplying the complex coefficients, Qsmn, by the spherical wave function, $\vec{F}_{smn}(r,\theta,\phi)$. An array pattern is formed by summing up the patterns of the individual elements. Equation 7 shows an example of summing together two patterns using the spherical wave expansion.

(Equation 7: Summation of Two Patterns using the Sum of Spherical Waves)

$$\vec{E}_1 + \vec{E}_2 = \left(\frac{k}{\sqrt{\eta}} \sum_{s=1}^{2} \sum_{n=1}^{N} \sum_{m=-n}^{n} Q_{smn_1} \vec{F}_{smn}(r, \theta, \phi)\right) + \left(\frac{k}{\sqrt{\eta}} \sum_{s=1}^{2} \sum_{n=1}^{N} \sum_{m=-n}^{n} Q_{smn_2} \vec{F}_{smn}(r, \theta, \phi)\right)$$

The spherical wave function, $\vec{F}_{smn}$, is the same for both patterns, the only difference between the two patterns are the coefficients, Qsmn. Equation 8 can be used to describe the inner terms when multiple patterns are summed together. The distributive property can be used to factor out $\vec{F}_{smn}$, which results in the summation of the coefficients multiplied by $\vec{F}_{smn}$ (Equation 8: Inner Terms showing Coefficient Summation)

$$Q_1 F + Q_2 F + \ldots Q_N F = (Q_1 + Q_1 + \ldots Q_N) F$$

(Equation 9: Spherical Wave Expansion for Pattern Summation)

$$\vec{E}(r, \theta, \phi)_{Array} = \frac{k}{\sqrt{\eta}} \sum_{s=1}^{2} \sum_{n=1}^{N} \sum_{m=-n}^{n} \left(\sum_{p=1}^{P} Q_{smn_p}\right) \vec{F}_{smn}(r, \theta, \phi)$$

The general expression for summing together multiple patterns can then be reduced to Equation 9 (Equation where p is the number of individual element patterns and $Qsmn_p$ are the coefficients for the $p^{th}$ pattern. This is a very powerful expression because it states that the sum of individual element patterns can be found by summing together the coefficients. Essentially, the coefficients of an array pattern equal the sum of the coefficients of the individual elements.

Equation 9 shows that the array pattern can be computed by summing up the coefficients of the individual element pattern coefficients. However, the array pattern is a weighted sum of the element patterns where the weights are complex coefficients used for sidelobe weighting as well as a phase progression. Equation 10 shows a modified version of Equation 9 which includes the term, $W_p$, which represents the individual weight for the $p^{th}$ element.

The coefficients for a single element pattern can be stored as a single vector and those vectors can be put a matrix with a dimension of the number of coefficients by the number of patterns. That matrix can then be multiplied by a vector of the weights that has a length equal to the number of patterns. The beamforming of the coefficients can then be expressed as one matrix operation as shown in Equation 11.

Equation 11: Matrix Operation with Coefficient Beamforming $$\begin{bmatrix} Q_{11-n_1} & \cdots & Q_{11-n_p} \\ \vdots & \ddots & \vdots \\ Q_{smn_1} & \cdots & Q_{smn_p} \end{bmatrix} \begin{bmatrix} W_1 \\ \vdots \\ W_p \end{bmatrix} = \begin{bmatrix} Q_{11-n} \\ \vdots \\ Q_{smn} \end{bmatrix}$$

Summing together the coefficients might not seem like a big deal, the traditional method of beamforming involves summing up the individual patterns so why does it make a difference? The answer relates to the above discussion. Recall that the element patterns for Gryphon are 507 MB in size and the modal coefficients have been reduced to 14 MB. There is a significant speed and memory advantage to loading and summing a 507 MB data block vs 14 MB. This different is magnified because a tactical calibration file will require forming thousands of beam patterns.

The other advantage relates to how the pattern can be evaluated. As discussed above regarding requiring high resolution beam patterns and how those are formed by interpolating a high resolution element pattern, summing together the element patterns, and then interpolating out the az/el cut. This is a multistep operation which is memory and CPU intensive. By beamforming the coefficients, which gives the coefficients of the formed beam, the pattern can be evaluated at any user defined angles at any given resolution. Instead of carrying around the 3D pattern information, the coefficients are used to compute the exact angles in the az/el cut.

Along with beamforming, the coefficients can also be used to compute the monopulse ratio. Dividing the delta beam coefficients by the sum beam coefficients results in the monopulse beam coefficients and those coefficients can then be used to generate a high resolution monopulse curve.

The TICRA software can also be used to prove that the procedure outlined in section 6 is valid. The Gryphon element patterns were used as a test case and the coefficients of each element pattern were computed and then beamformed. The pattern was then generated using the beamformed coefficients and compared to the same pattern using standard pattern summation. Modal truncation and using a reduced precision for the coefficients were also evaluated.

Equation 10: Spherical Wave Expansion for Pattern Summation with a Weighting Function $$\vec{E}(r, \theta, \phi)_{Array} = \frac{k}{\sqrt{\eta}} \sum_{s=1}^{2} \sum_{n=1}^{N} \sum_{m=-n}^{n} \left(\sum_{p=1}^{P} Q_{smn_p} W_p\right) \vec{F}_{smn}(r, \theta, \phi)$$

Figure 9:
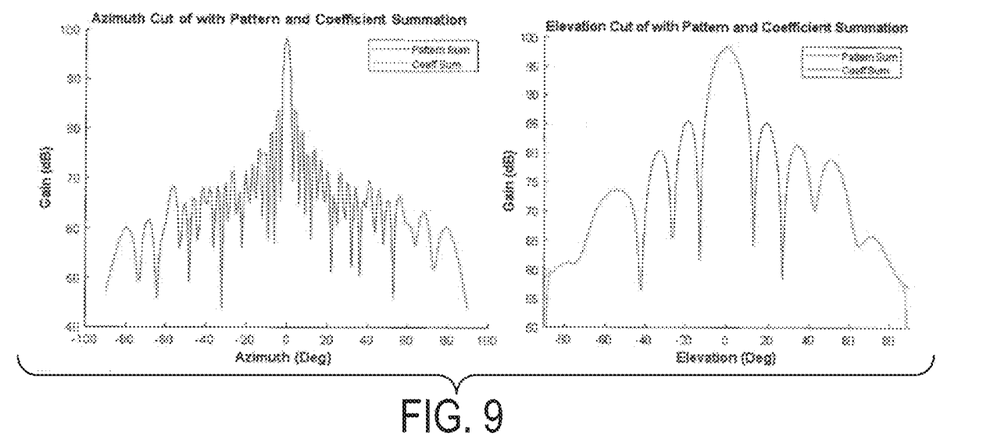
FIG. 9 depicts example azimuth and elevation cuts with pattern and coefficient summation.
Figure 10:
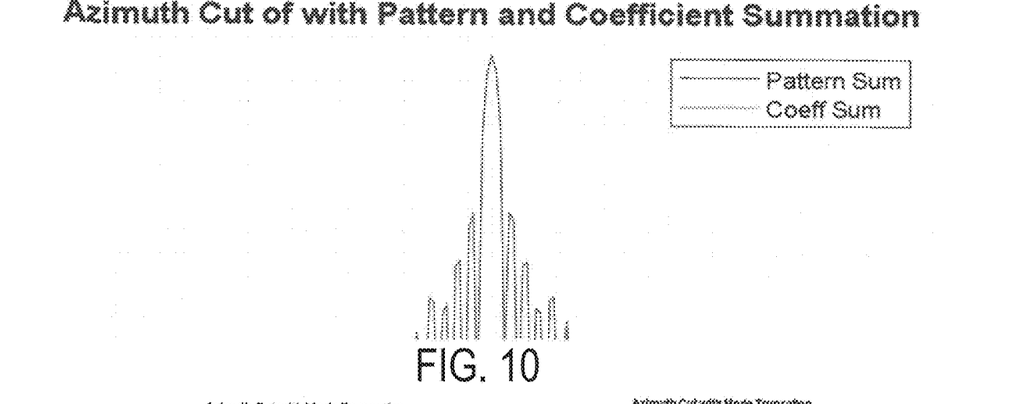
FIG. 10 depicts a zoomed view of an example azimuth cut with pattern and coefficient summation.

FIG. 9 shows a comparison of the az and el cuts using modal beamforming and element pattern summation and the results are identical. FIG. 10 shows a zoom-in view of an azimuth cut using element patterns with a 1-degree resolution. The figure shows how the main beam is not accurately depicted because of the low resolution. This resolution is not sufficient for monopulse. With pattern summation, the element patterns would need to be interpolated to increase the resolution but with modal beamforming, Equation 10 can be evaluated at a higher resolution and only the angles pertaining to the az and el cut need to be evaluated. It is not necessary to generate the 3D pattern and then interpolate out the requisite az/el cut.

Results are not shown here, but it should also be noted that the beamformed coefficients were compared with the modal coefficients for the formed beam using pattern summation. The beam using pattern summation was run through the TICRA code in order to capture the coefficients. The coefficients were the same except for rounding error due to a fixed number of decimal points being stored in the coefficient file.

FIG. 9 shows that the procedure outlined above is valid. The next step is to see if the coefficient file size can be reduced by truncating the modes below a certain power level. The total number of modes for each element was originally 103. Modal truncation was tested by starting at 50 modes and incrementing by five until all the modes were included. The modes were truncated by setting the coefficients of the truncated modes to zero. It would be more efficient to not include the coefficients and not evaluate the higher order modes but this was an efficient way to test out truncation. Once the modes were truncated, the azimuth cuts were generated.

Figure 11:
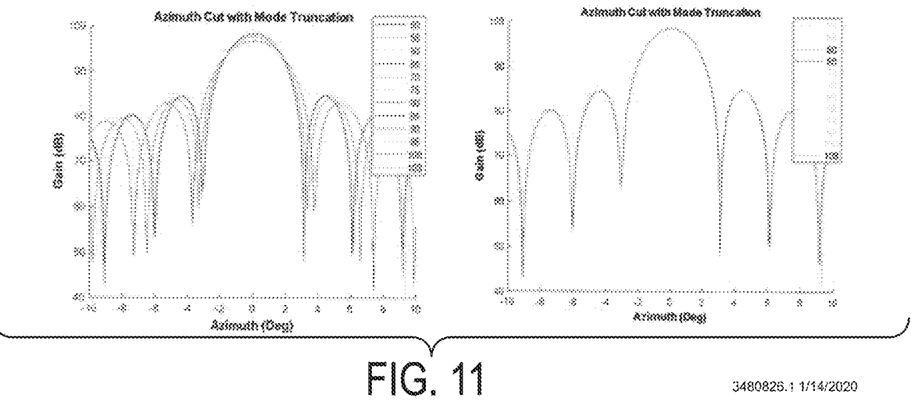
FIG. 11 depicts example azimuth cuts with mode truncation.

FIG. 11 shows the azimuth cuts with the truncated modes. Notice that the azimuth cuts are zoomed into the main part of the beam and the resolution was increased using the coefficients. This was all done without interpolation. The resolution was increased to 0.1 degrees and only the angles relating to the azimuth cut were generated which save time in the pattern calculation.

FIG. 11 shows that the beamwidth starts to increase as more modes are truncated. Truncating the modes, is similar to reducing the size of the minimum sphere around the radiating structure which limits the area of the aperture that is allowed to contribute to the main beam. If too many modes are truncated, the beam starts to look like it came from a smaller aperture. This feature can be used to do spatial filtering if there is an obstruction or scattering source next to the antenna that the user would like to filter out. This is the idea behind the Iso-filter tool in the MI-3000. The antenna can be spatial moved to center up the important part of the antenna in the coordinate system and then the number of modes can be reduced to filter out the effects of structures outside of the minimum sphere.

FIG. 11 shows that the number of modes can be reduced from 103 to around 60 or 65 without affecting the pattern shape. This agrees with the prediction for the number of reduced modes based on the power in each mode from other figures.

Figure 12:
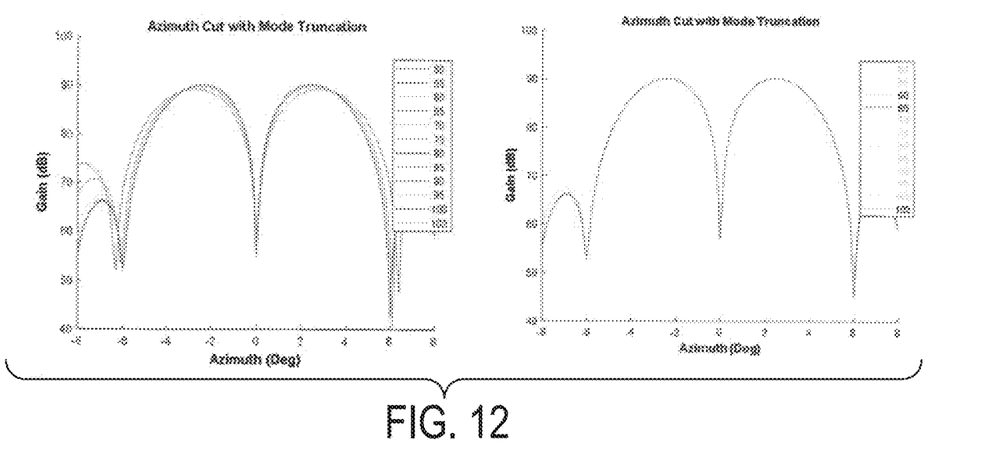
FIG. 12 depicts example azimuth cuts with mode truncation.
Figure 13:
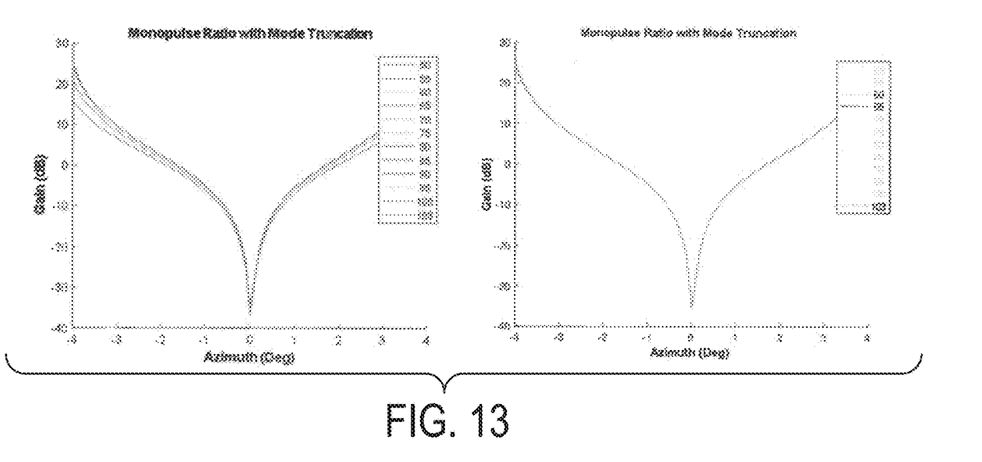
FIG. 13 depicts example truncation with monopulse.

The same procedure was run on a delta beam to verify that it didn't impact the null depth and also with truncated beams that form a monopulse ratio. FIG. 12 shows that the results are the same and that around 65 modes are needed to fully capture the pattern. FIG. 13 shows a negligible effect on monopulse. Any errors shown in monopulse by truncating the modes would be overshadowed by other errors in the system.

It has been shown that modal truncation can be used to reduce the size of the coefficient file. However, if the precision used to store the coefficients can be reduced, an even greater reduction in file size will be achieved. Testing precision is more difficult using the TICRA software because the values are written to a text file which is read in by the software. An example of a coefficient file is shown in FIG. 14. This file can also be stored in binary but for ease of use, the text format was used for the test cases. FIG. 14 shows that the coefficients are stored with only six decimal places so even if the coefficients are stored in double precision in a Mat file, it essentially reduces to single precision when written to the file that is evaluated by TICRA.

FIG. 15 shows the integer types supported by Matlab. Int16 supports a range of integers from −32768 to 32767. FIG. 7 shows that the total range of coefficients only spans about −20 to +20. Therefore, the coefficients can be multiplied by 1000 and stored as an INT16 datatype. This essentially truncates the coefficients to three decimal places. INT16 was tested by multiplying the coefficients by 1000, converting to INT16 and then converting back to double precision and dividing by 1000 in order to write the data out to a text file. It should be noted that this conversion was done on each individual element pattern during the beamforming process so that the element coefficients were rounded off, not the coefficients of the final beam pattern.

Figure 16:
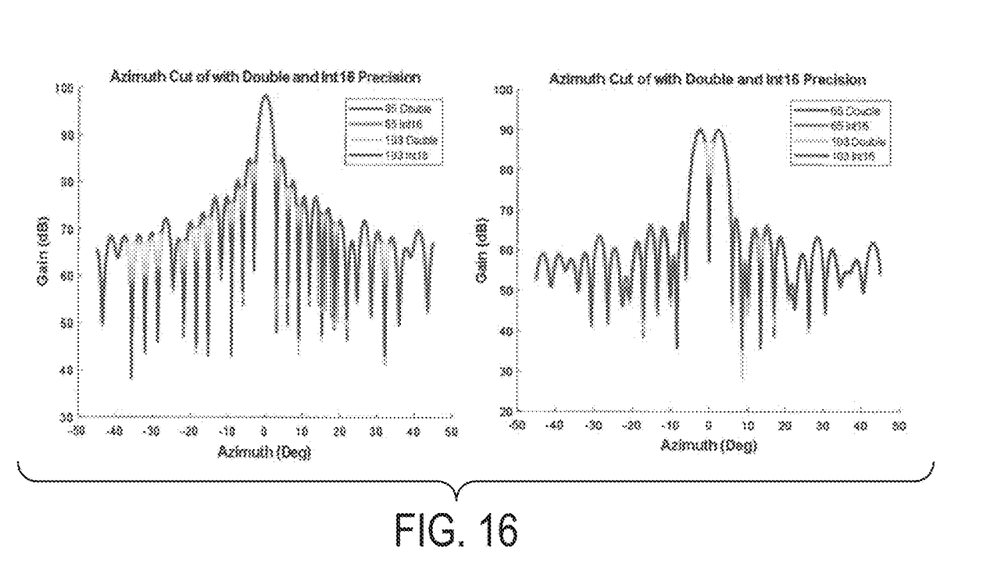
FIG. 16 depicts azimuth cuts with double and INT16 precision.

FIG. 16 shows the results of using double precision vs INT16 and also shows the results with 65 and 103 modes. The results show that there are some small perturbations on the sidelobe levels and sidelobe structure but negligible effects on the main beam area which is the major contributor to monopulse accuracy.

Figure 17:
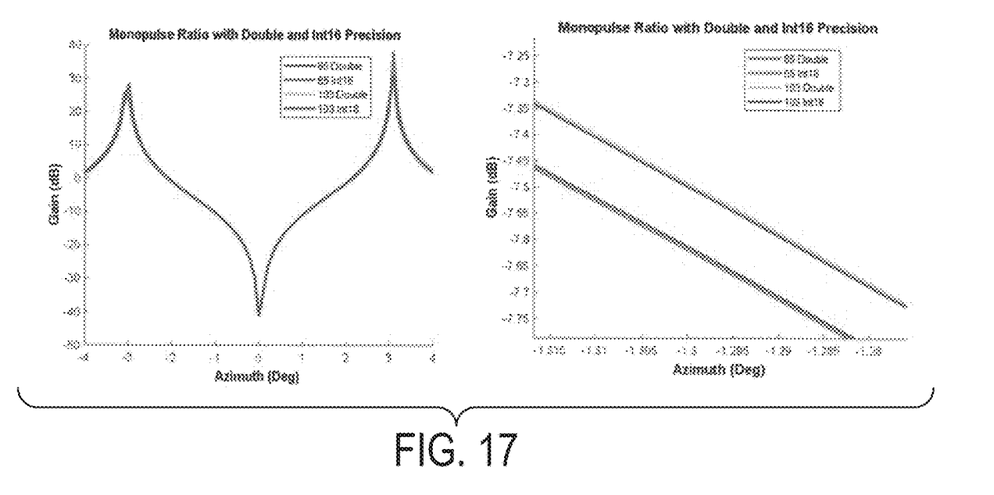
FIG. 17 depicts monopulse ratios with truncation and precision reduction.
Figure 18:
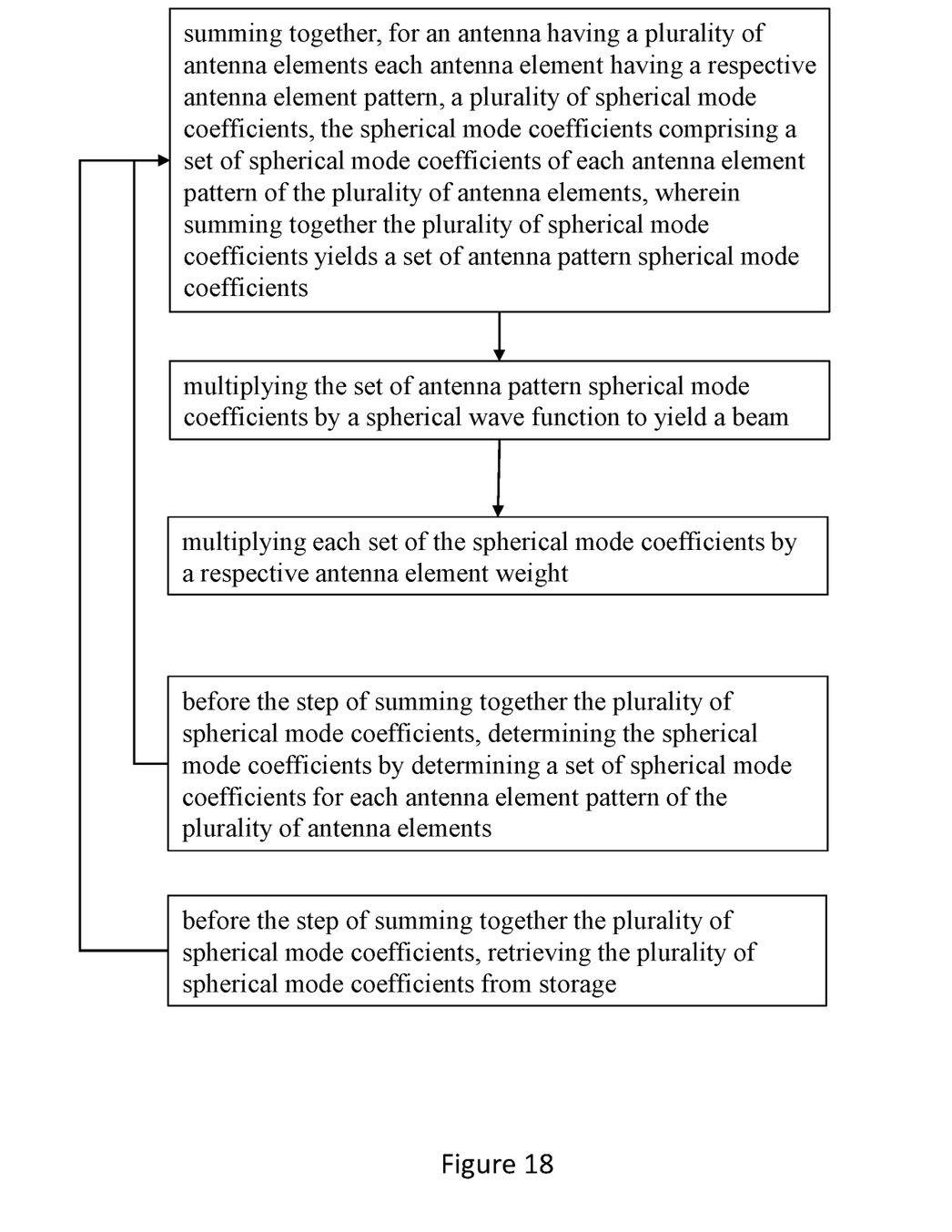
FIG. 18 is a flowchart depicting a method of beamforming.

FIG. 17 shows the monopulse results with the 65 and 103 modes and double and INT16 precision. The results show that more error is caused by modal truncation than the reduced precision. There is negligible errors due to the reduced precision and around 0.0125 degrees of error due to the modal truncation. To reduce the error, more modes could be includes but in either case, 0.0125 degrees of error is going to be in the noise compared to other system errors.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A method for beamforming, comprising the steps of:
providing an antenna having a plurality of antenna elements, wherein each antenna element has a respective antenna element pattern;
summing together, for the antenna having the plurality of antenna elements, a plurality of spherical mode coefficients, the spherical mode coefficients comprising a set of spherical mode coefficients of each antenna element pattern of the plurality of antenna elements, wherein summing together the plurality of spherical mode coefficients yields a set of antenna pattern spherical mode coefficients;
multiplying the set of antenna pattern spherical mode coefficients by a spherical wave function to yield a beam; and
forming the beam with the antenna.

2. The method of claim 1, further comprising the step of multiplying each set of the spherical mode coefficients by a respective antenna element weight.

3. The method of the claim 2, wherein the antenna element weight is determined by a phase progression across the plurality of antenna elements such that the beam is pointed in a desired direction.

4. The method of claim 2, wherein the antenna element weight is determined by a desired aperture distribution.

5. The method of claim 4, wherein the desired aperture distribution is a desired sidelobe weighting.

6. The method of claim 1, further comprising the step of, before the step of summing together the plurality of spherical mode coefficients, determining the spherical mode coefficients by determining a set of spherical mode coefficients for each antenna element pattern of the plurality of antenna elements.

7. The method of claim 6, wherein the plurality of spherical mode coefficients are truncated to discard spherical mode coefficients below a predetermined value.

8. The method of claim 1, further comprising the step of, before the step of summing together the plurality of spherical mode coefficients, retrieving the plurality of spherical mode coefficients from storage.

9. An antenna having a plurality of elements, wherein each antenna element has a respective antenna element pattern, comprising:
a processor programmed to sum together, a plurality of spherical mode coefficients, the spherical mode coefficients comprising a set of spherical mode coefficients of each antenna element pattern of the plurality of antenna elements, wherein summing together the plurality of spherical mode coefficients yields a set of antenna pattern spherical mode coefficients, to multiply the set of antenna pattern spherical mode coefficients by a spherical wave function to yield a beam; and
wherein the processor is programmed to beamform the beam using the plurality of element of the antenna.

10. The antenna of claim 9, further comprising program code for carrying out the step of multiplying each set of the spherical mode coefficients by a respective antenna element weight.

11. The antenna of claim 10, wherein the antenna element weight is determined by a phase progression across the plurality of antenna elements such that the beam is pointed in a desired direction.

12. The antenna of claim 10, wherein the antenna element weight is determined by a desired aperture distribution.

13. The antenna of claim 10, wherein the desired aperture distribution is a desired sidelobe weighting.

14. The antenna of claim 9, further comprising program code for carrying out the step of, before the step of summing together the plurality of spherical mode coefficients, determining the spherical mode coefficients by determining a set of spherical mode coefficients for each antenna element pattern of the plurality of antenna elements.

15. The antenna of claim 9, further comprising program code for carrying out the step of, before the step of summing together the plurality of spherical mode coefficients, retrieving the plurality of spherical mode coefficients from storage.

16. The antenna of claim 15, wherein the plurality of spherical mode coefficients are truncated to discard spherical mode coefficients below a predetermined value.

17. A method for compressing an antenna pattern, comprising the steps of:
receiving a signal from an antenna having a plurality of antenna elements each antenna element having a respective antenna element pattern;
determining from the signal received from the antenna having the plurality of antenna elements a plurality of spherical mode coefficients, the spherical mode coefficients comprising a set of spherical mode coefficients of each antenna element pattern of the plurality of antenna elements;
reducing the set of spherical mode coefficients of each antenna element pattern of the plurality of antenna elements by discarding any spherical mode coefficients of the plurality of spherical mode coefficients that are below a threshold power to provide a subset of the plurality of spherical mode coefficients that are above the threshold power;
storing the subset of the plurality of spherical mode coefficients to provide a coefficient file; and
computing a far-field pattern along with a pattern at a specified radius from the coefficient file.

18. The method of claim 17, wherein the spherical mode coefficients below the threshold power are replaced with zeros.

19. The method of claim 17, wherein the spherical mode coefficients below the threshold power are removed.

20. The method of claim 17, further comprising the step of restoring the subset of the plurality of spherical mode coefficients and forming a beam according to the subset of the plurality of spherical mode coefficients, wherein the beam is formed by multiplying a sum of the subset of the plurality of spherical mode coefficients with a spherical wave function.

* * * * *